No. 740,043.

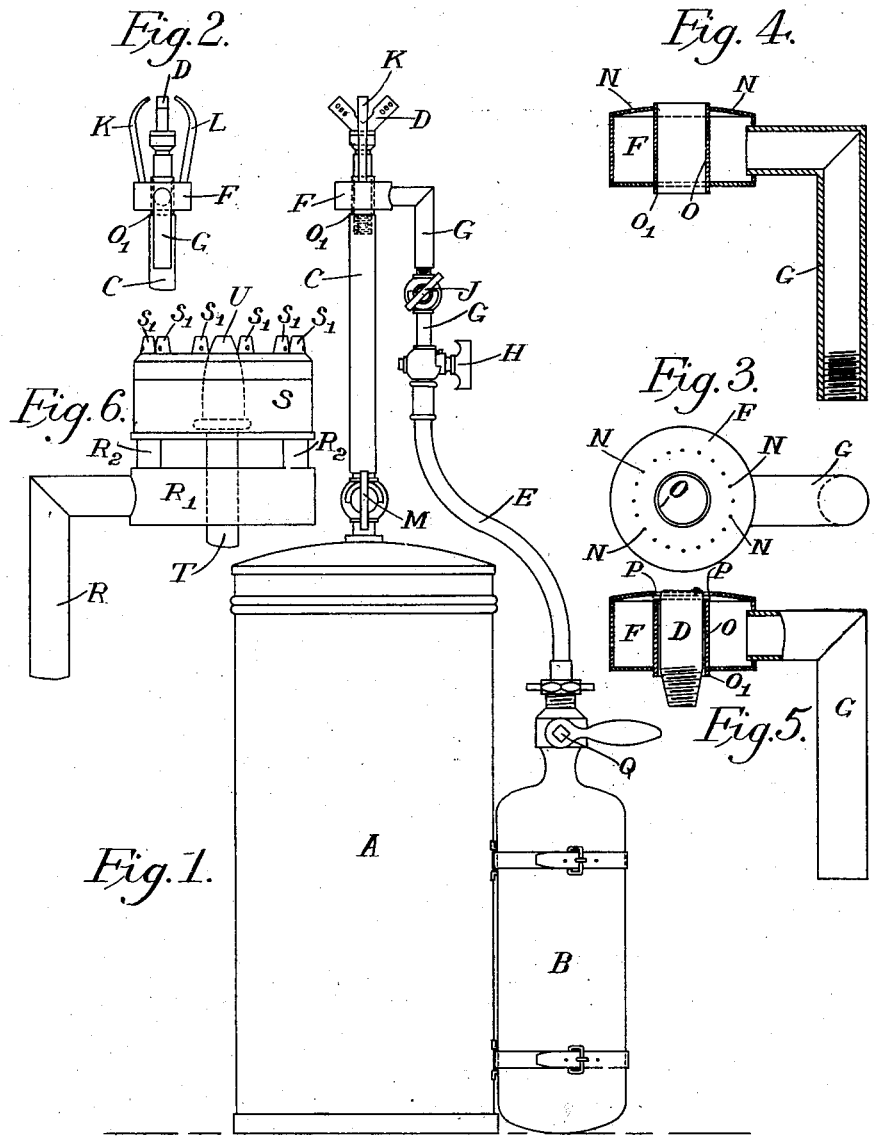

Patented September 29, 1903.

UNITED STATES PATENT OFFICE.

JOHN REID, OF LONDON, ENGLAND.

ACETYLENE-GAS BURNER.

SPECIFICATION forming part of Letters Patent No. 740,043, dated September 29, 1903.

Application filed February 24, 1903. Serial No. 144,879. (No model.)

*To all whom it may concern:*

Be it known that I, JOHN REID, M. A., a subject of the King of Great Britain and Ireland, residing at 3 Pump Court, Temple, in the city and county of London, England, (whose post-office address is 3 Pump Court, Temple, in the city and county of London, England,) have invented certain new and useful Improvements in Acetylene-Gas Burners; and I do hereby declare the following to be a full, clear, and exact description of the invention, such as will enable others skilled in the art to which it appertains to make and use the same.

This invention relates to apparatus for burning acetylene gas; and it consists in the novel construction and combination of the parts hereinafter fully described and claimed.

In the drawings, Figure 1 is a side view of the apparatus. Fig. 2 is a side view of the fish-tail burner D. Fig. 3 is a plan view of an alternative mixer, and Fig. 4 is a vertical section of same. Fig. 5 is a vertical section of another alternative mixer. Fig. 6 is a side view of an Argand burner with this invention applied to it.

I will now describe a method of carrying out my invention with reference to the accompanying drawings, in which the same reference-letters refer to the same or equivalent parts in the several figures.

Fig. 1 is a front elevation of a complete apparatus for producing the new light, which apparatus comprises an acetylene-generator A and an oxygen-cylinder or other source of supply of oxygen (O) marked B. C is the acetylene-supply pipe, connected to the generator A, and D is a fish-tail burner fixed in pipe C. E is the oxygen-supply pipe (which may be a flexible pipe) connecting the oxygen-reservoir B with a chamber F, which may be either fixed to or detachably mounted on the acetylene-supply pipe C, or said chamber F might be fixed to the stem of burner D. In the example shown in the drawings, G is an elbow or branch pipe connected to chamber F, the oxygen-supply pipe E being connected to said branch G. H and J are two cocks in branch pipe G (or they might be in pipe E) for controlling and regulating the supply and cut-off of the oxygen. K and L (see Fig. 2) are two by-passes or nozzles connected to chamber F at opposite sides and so arranged as to deliver the oxygen from said chamber at the point of ignition or at the base of the frame. M, Fig. 1, is the cock for controlling and regulating the supply and cut-off of the acetylene.

Fig. 2 is a side view of the fish-tail burner D, showing clearly the two nozzles or oxygen-jets K and L, above referred to.

Fig. 3 is a plan view of an alternative arrangement for mixing the oxygen with the acetylene, and Fig. 4 is a sectional elevation of same. In this arrangement instead of the nozzles or by-passes K L of Fig. 2 the top of chamber F is perforated by a number of small holes N, through which the oxygen passes to mix with the acetylene at or near the burner-outlet.

In Figs. 1, 2, 3, 4, and 5, O is a sleeve or short tube fixed centrally in chamber F, the lower end O' of said tube (in the example shown in Figs. 1 and 2) resting on the top of pipe C.

Fig. 5 shows another alternative method of delivering the oxygen from chamber F, and it is shown in connection with an ordinary form of gas-burner, (as distinct from the fish-tail burner shown in Figs. 1 and 2.) According to this arrangement an annular opening or outlet P is provided at the connecting-point between the top of sleeve O and the top of chamber or box F, approximately on a level with the top or gas-outlet of burner D.

Q, Fig. 1, indicates a valve or cock on the oxygen-reservoir B for controlling the supply and cut-off of the oxygen from said reservoir.

Fig. 6 shows an application of my invention to an Argand burner. In this figure, R is the acetylene-supply pipe, which is connected to a chamber R', which latter is connected by pipes $R^2$ $R^2$ to the annular burner S. s' represents the nipples or outlets for the acetylene, fixed in S. T is the oxygen-supply pipe, (corresponding to E G in Fig. 1,) which is to be connected to the oxygen-reservoir B, Fig. 1. U is a nozzle on the pipe T, arranged centrally in the burner-ring S, so as to deliver the oxygen at the ignition-point or approximately at the point of outlet of the acetylene from burner S.

In practice the acetylene-supply cock M and one of the oxygen-supply cocks—for example, H—may be connected together, so as to act simultaneously when operated, and thus simultaneously supply the acetylene and the oxygen to the ignition-point or burner, although this simultaneous supply is not essential to the invention. The other oxygen-supply cock is (in the example shown in Fig. 1) for the purpose of regulating the quantity of oxygen supplied, so that when the quantity of oxygen it is desired to mix with the acetylene has been fixed the cock J may always remain open to the proper extent to supply the desired quantity of oxygen to the burner.

What I claim as my invention, and desire to secure by Letters Patent, is—

1. The combination, with a supply-pipe for acetylene gas, and a burner which projects from the said pipe; of a chamber F provided with a tube O which encircles one of the said parts and which is supported by the said pipe, said chamber being provided with outlets for delivering oxygen to the flame, and a supply-pipe for oxygen connected to the said chamber.

2. The combination, with a supply-pipe for acetylene gas, and a burner which projects from the said pipe; of a chamber F provided with a tube O which encircles one of the said parts and which is supported by the said pipe, curved outlet-pipes projecting from the said chamber and delivering oxygen to the flame at opposite points, and a supply-pipe for oxygen connected to the said chamber.

In testimony whereof I affix my signature in presence of two witnesses.

JOHN REID.

Witnesses:
  W. H. SINSON,
  WALTER E. ROCHE.